US009661620B2

(12) United States Patent
McNamara et al.

(10) Patent No.: US 9,661,620 B2
(45) Date of Patent: May 23, 2017

(54) MOBILE TERMINAL AND METHOD USING SHORT IDENTIFIER FOR RESOURCE SCHEDULING

(75) Inventors: Darren McNamara, Clevedon (GB); Andrew Lillie, Bristol (GB); Peter Darwood, Bristol (GB); Martin Beale, Bristol (GB)

(73) Assignee: SCA IPLA HOLDINGS INC, New York, NY (US)

( * ) Notice: Subject to any disclaimer, the term of this patent is extended or adjusted under 35 U.S.C. 154(b) by 743 days.

(21) Appl. No.: 13/983,587

(22) PCT Filed: Feb. 3, 2012

(86) PCT No.: PCT/GB2012/050224
§ 371 (c)(1),
(2), (4) Date: Sep. 25, 2013

(87) PCT Pub. No.: WO2012/104645
PCT Pub. Date: Aug. 9, 2012

(65) Prior Publication Data
US 2014/0010212 A1    Jan. 9, 2014

(30) Foreign Application Priority Data

Feb. 4, 2011 (GB) .................... 1101966.8
Feb. 4, 2011 (GB) .................... 1101967.6

(51) Int. Cl.
*H04W 72/04* (2009.01)
*H04W 72/12* (2009.01)
(Continued)

(52) U.S. Cl.
CPC ......... *H04W 72/042* (2013.01); *H04L 5/0037* (2013.01); *H04W 72/1289* (2013.01); *H04W 8/26* (2013.01); *H04W 72/1205* (2013.01)

(58) Field of Classification Search
CPC .................................................... H04W 8/005
See application file for complete search history.

(56) References Cited

U.S. PATENT DOCUMENTS

| | | |
|---|---|---|
| 2008/0057972 A1 | 3/2008 | Doettling et al. |
| 2008/0153504 A1 | 6/2008 | Bourlas et al. |

(Continued)

FOREIGN PATENT DOCUMENTS

| | | |
|---|---|---|
| CN | 101502077 A | 8/2009 |
| CN | 101855933 A | 10/2010 |

(Continued)

OTHER PUBLICATIONS

U.S. Appl. No. 14/723,070, filed May 27, 2015, McNamara, et al.
(Continued)

*Primary Examiner* — Shaq Taha
*Assistant Examiner* — Manuel Rangel
(74) *Attorney, Agent, or Firm* — Oblon, McClelland, Maier & Neustadt, L.L.P.

(57) ABSTRACT

A mobile terminal for use in a mobile communications network includes a wireless access interface that provides a shared communications channel for communicating data to/from the mobile communications network, the shared channel divided in time into units of communications resource. The mobile terminal is configured to receive control information with a short identification number in association with an identification number allocated to the mobile terminal by the mobile communications network, the short identification number allocated to the mobile terminal by the mobile communications network for one super-frame including plural of the units of communications resource of the shared channel, the short identification number allocated to the mobile terminal as one member of a group of mobile terminals, and to receive a resource allocation message (Continued)

including the short identification number to identify the mobile terminal and to allocate units of the communications resource to the mobile terminal in one super-frame.

21 Claims, 6 Drawing Sheets

(51) Int. Cl.
*H04L 5/00* (2006.01)
*H04W 8/26* (2009.01)

(56) References Cited

U.S. PATENT DOCUMENTS

| | | | |
|---|---|---|---|
| 2010/0220668 A1* | 9/2010 | Yamada | H04L 5/0007 370/329 |
| 2011/0021215 A1* | 1/2011 | Iwamura | H04W 76/048 455/458 |
| 2011/0038299 A1* | 2/2011 | Sugawara | H04L 12/189 370/312 |
| 2012/0093051 A1* | 4/2012 | Xu | H04W 72/005 370/311 |
| 2012/0134344 A1* | 5/2012 | Yu | H04W 72/14 370/336 |

FOREIGN PATENT DOCUMENTS

| EP | 1 981 302 A1 | 10/2008 |
|---|---|---|
| WO | WO 2007/052120 A1 | 5/2007 |
| WO | WO 2008/097030 A1 | 8/2008 |
| WO | WO 2009/023741 A2 | 2/2009 |
| WO | WO 2009/131087 A1 | 10/2009 |

OTHER PUBLICATIONS

U.S. Appl. No. 13/983,673, filed Aug. 5, 2013, McNamara, et al.
U.S. Appl. No. 13/983,692, filed Aug. 5, 2013, McNamara, et al.
U.S. Appl. No. 13/983,441, filed Aug. 2, 2013, McNamara, et al.
U.S. Appl. No. 13/983,455, filed Aug. 2, 2013, McNamara, et al.
U.S. Appl. No. 13/983,685, filed Aug. 5, 2013, McNamara, et al.
Search Report issued Jun. 9, 2011 in United Kingdom Patent Application No. GB1101966.8.
International Search Report issued Mar. 26, 2012 in PCT/GB2012/050224.
"Short UE Identity for Downlink Scheduling Information" Sharp, 3GPP TSG R1-062257, vol. RAN WG1, XP050102785, Aug. 23, 2006, pp. 1-7.
"Optimized L1/L2 Control Channel Formats" Sharp, 3GPP TSG R2-070514. vol. RAN WG2, XP050133568, Feb. 9, 2007, pp. 1-6.
"Shorter UE ID for Downlink Scheduling Information" Sharp, 3GPP TSG R2-063282, vol. RAN WG2, XP050132771, Nov. 1, 2006, pp. 1-6.
U.S. Appl. No. 13/982,382, filed Jul. 29, 2013, Beale.
Chinese Office Action dated Mar. 8, 2016, issued in Chinese Patent Application No. 201280007764.2.

* cited by examiner

| RNTI | short-ID |
|---|---|
| 61465 | 1 |
| 10983 | 2 |
| 00237 | 3 |

Table 1 - Explicit mapping of RNTIs to short-IDs

| RNTI | implicit short-ID |
|---|---|
| 61465 | 1st RNTI in list, hence short-ID=1 |
| 10983 | 2nd RNTI in list, hence short-ID=2 |
| 00237 | 3rd RNTI in list, hence short-ID=3 |

Table 2 - Implicit mapping of RNTIs to short_IDs

| RNTI | short-ID |
|---|---|
| 61465 | 1 |
| 00237 | 1 |
| 10987 | 2 |
| 65535 | 3 |

MOBILE TERMINAL AND METHOD USING SHORT IDENTIFIER FOR RESOURCE SCHEDULING

CROSS-REFERENCE TO RELATED APPLICATIONS

The present application claims priority to British Patent Applications 1101966.8 and 1101967.6 filed in the U.K. on Feb. 3, 2011, the entire contents of which are incorporated hereby reference.

FIELD OF THE INVENTION

The present invention relates to mobile communications systems for communicating data to and/or from mobile communications terminals, infrastructure equipment, mobile communications terminals and methods for communicating.

BACKGROUND OF THE INVENTION

Mobile communication systems have evolved over the past ten years or so from the GSM System (Global System for Mobiles) to the 3 G system and now include packet data communications as well as circuit switched communications. The third generation partnership project (3GPP) has now begun to develop a mobile communication system referred to as Long Term Evolution (LTE) in which a core network part has been evolved to form a more simplified architecture based on a merging of components of earlier mobile communications network architectures and a radio access interface which is based on Orthogonal Frequency Division Multiplexing (OFDM) on the downlink and Single Carrier Frequency Division Multiple Access (SC-FDMA) on the uplink. The core network components are arranged to communicate data packets in accordance with an enhanced packet communications system.

At present mobile communications services are dominated by human to human (H2H) communications, that is, data which is transmitted by a human to another human or at least data that is transmitted for presentation to a human being. It is now recognised that there is a desire to cater for communications to and/or from machines which are referred to generally as machine type communications (MTC) or machine to machine (M2M) communications. MTC communications can be characterised as communicating data which has been generated from a source automatically, for example in response to some other stimulus, or event reporting some attribute of the machine, or some monitored parameter, or so-called smart metering. Human communications such as voice can be characterised as being communications requiring a communications session of some minutes with data being generated in bursts of several milliseconds with pauses there between. Human communications such as video can be characterised as streaming data at a substantially constant bit rate. In contrast MTC communications can generally be characterised as sporadically communicating small quantities of data although, it can be appreciated that there is also a wide variety of possible MTC communications.

As will be appreciated it is generally desirable to provide a mobile communications system and network which can operate efficiently, particularly although not exclusively in respect of the challenges presented by communicating data packets generated by MTC communications devices.

SUMMARY OF THE INVENTION

According to the present invention there is provided a mobile terminal for use in a mobile communications network. The mobile terminal includes a transmitter and a receiver which are configured to transmit and to receive data via a wireless access interface for communicating the data to and/or from a base station of the mobile communications network. The wireless access interface provides a shared communications channel for communicating data to or from the mobile communications network, the shared channel being divided in time into units of communications resource which are allocated by a scheduler of the base station to the mobile terminal, and a shared control channel for receiving resource allocation messages from the base station. The mobile terminal is configured to receive control information providing the mobile terminal with a short identification number in association with an identification number allocated to the mobile terminal by the mobile communications network, the short identification number being allocated to the mobile terminal by the mobile communications network for one super-frame which comprises a plurality of the units of communications resource of the shared channel, the short identification number being allocated to the mobile terminal as one member of a group of mobile terminals, and to receive a resource allocation message which includes the short identification number to identify the mobile terminal and to allocate units of the communications resource to the mobile terminal in one super-frame.

According to another aspect of the present invention there is provided a mobile communications network for communicating data to and/or from mobile terminals, the mobile communications network including a base station which includes a transmitter and a receiver which are arranged in operation to provide a wireless access interface for communicating the data to and/or from the mobile terminals and a scheduler for allocating communications resources of the wireless access interface to the mobile terminals for communicating the data. The wireless access interface provides a shared channel for communicating data to or from the mobile terminals, the shared channel being divided in time into different units of communications resource which are allocated by the scheduler of the base station to the mobile terminals, and a shared control channel for communicating resource allocation messages to the mobile terminals, wherein each of a plurality of the mobile terminals is divided into a plurality of different groups. The mobile communications network is configured to form super-frames comprising a plurality of the units of communications resource of the shared channel, to allocate each of the mobile terminals in one or more groups, and to transmit control information providing for each of the mobile terminals in each of the groups of mobile terminals a short identification number in association with an identification number allocated to the mobile terminal by the mobile communications network, the short identification number for use in allocating the units of communications resource to each of the mobile terminals in one of the groups for one of the super-frames.

Embodiments of the present invention can provide a mobile communications network or system in which an arrangement is provided for reducing the size of resource allocation messages, which allocate resources of a shared channel to mobile communications devices for communicating data. As a result, there is an improvement in efficiency with which allocation messages are communicated to communications terminals. This is as a result of a reduction in an amount of data required to be communicated to a mobile terminal to allocate resources, because of the use of the short identification numbers for each terminal in a group for each super-frame. Alternatively or in addition, the resource allocation messages can be transmitted more frequently using the same bandwidth which may be available for conventional allocation messages.

In one example the allocation of short identification numbers to each of the communications terminals in a group may be made for a plurality of super-frames or may not be correlated with the assignment of the groups of terminals to the super frames.

As explained above, the reduction in the size of the resource allocation messages is achieved by allocating shortened identifiers to mobile terminals, which may be on a basis of a super-frame. The mobile terminals are divided into different groups and for one or more super-frames a short identifier is allocated to each of the mobile terminals of one of the groups in association with an identification number which is conventionally used and allocated to the mobile terminals for allocating resources. Thus for the duration of the super-frames the short identifiers can be used to allocate resources to the mobile terminals of the group. In the next super-frame the short identifiers are allocated to a potentially different group of mobile terminals. Thus the same short identifier can be re-used between super frames but allocated to different mobile terminals, so that the short identifier can be a small quantity of data such as a few bits and smaller than the identification number. In one example the different groups are mutually exclusive so that one mobile terminal is allocated to one group only, but in other examples a mobile terminal may be allocated to more than one group.

Although the allocation of the short identifiers to the mobile terminals in each group may be made on the basis of one or more of the super-frames, only one of the groups of terminals can use the short identifiers per super frame.

The super-frame is comprised of a plurality of units of resource, which are formed by dividing a repeating frame in time, which may be equal time divisions. In one example, the units are sub-frames of a frame, so that the super-frame is formed from a repeating set of sub-frames, which may be greater than the frame.

As will be appreciated, if a mobile terminal belongs to a group which has not been allocated a short identifier for the current super-frame then it may have to wait longer before communications resources can be allocated to it. However, the base station may have some time critical data to be communicated to that mobile terminal. Accordingly, in some examples, the base station may communicate a resource allocation message to a mobile terminal via the shared control channel, when the mobile terminal has not been allocated a short identifier for a current super frame, in which the resource allocation message includes an identification number of the mobile terminal.

According to some embodiments the identification number which is replaced by the short identifier in the resource allocation messages is a radio network temporary identifier or the like.

Further aspects and features of the present invention are defined in the appended claims and include an infra-structure element, a mobile terminal and methods.

BRIEF DESCRIPTION OF THE DRAWINGS

Example embodiments of the present invention will now be described with reference to the accompanying drawings in which like parts have the same designated references and in which.

DESCRIPTION OF EXAMPLE EMBODIMENTS

Figure 1:
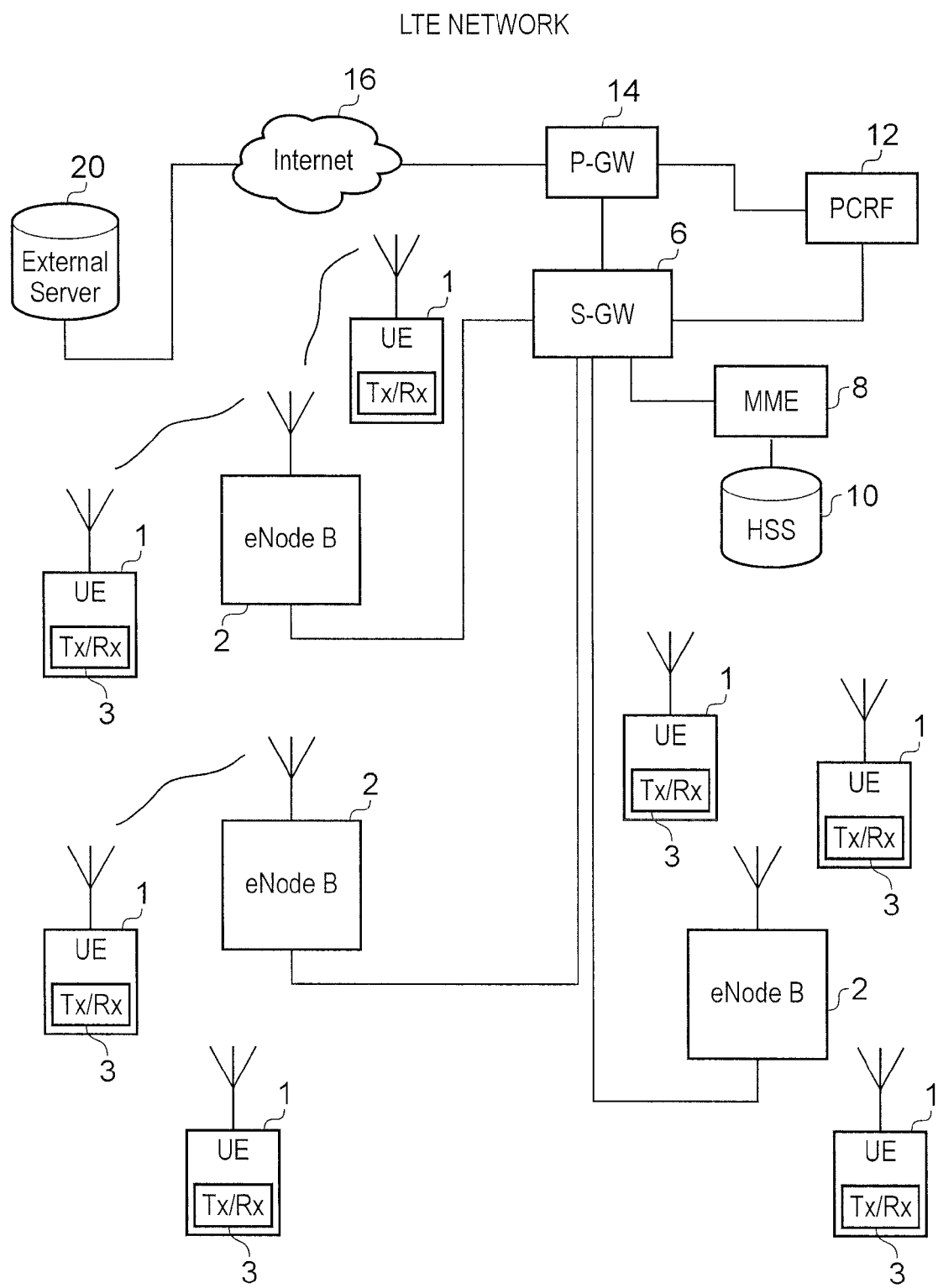
FIG. 1 is a schematic block diagram of a mobile communications network and mobile communications devices forming a communication system which operates in accordance with the 3GPP Long Term Evolution (LTE) standard.

Embodiments of the present invention will now be described with reference to an implementation which uses a mobile communications network operating in accordance with the 3GPP Long Term Evolution (LTE) standard. FIG. 1 provides an example architecture of an LTE network. As shown in FIG. 1 and as with a conventional mobile communications network, mobile communications devices (also called UEs or terminals) 1 are arranged to communicate data to and from base stations 2 which are referred to in LTE as enhanced NodeBs (e-NodeB). For transmitting and receiving data via the wireless access interface the communications devices 1 each include a transmitter/receiver unit 3.

The base stations or e-NodeB's 2 are connected to a serving gateway S-GW 6 which is arranged to perform routing and management of mobile communications services to the communications devices 1 as they roam throughout the mobile communications network. In order to maintain mobility management and connectivity, a mobility management entity (MME) 8 manages the enhanced packet service (EPS) connections with the communications devices 1 using subscriber information stored in a home subscriber server (HSS) 10. Other core network components include the policy charging and resource function (PCRF) 12 and a packet data gateway (P-GW) 14 which connects to an internet network 16 and finally to an external server 20. More information may be gathered for the LTE architecture from the book entitled "*LTE for UMTS OFDM and SC-FDMA based radio access*", Holma H. and Toskala A. page 25 ff.

In the following description LTE/SAE terminology and names are used. However embodiments of the present technique can be applied to other mobile communications systems such as UMTS and GERAN with the GSM/GPRS core network.

LTE and RNTI Allocation

According to the LTE standard, communications are arranged in packet switched form in that a physical channel on the up-link and the down-link is not permanently allocated to a communications device. Communications resources on both the up-link and the down-link for transmitting data are shared amongst all of the communications devices. On the up-link data is transmitted in physical up-link shared channels (PUSCH) whereas the down-link data is transmitted to the mobile communications devices on physical down-link shared channels (PDSCH). The allocation of resources on the up- and down-link shared channels is managed by the eNode B using a physical down-link control channel (PDCCH). If data is to be transmitted to a particular mobile communications device then the eNode B transmits a message on the down-link control channel which all of the mobile communications devices listen to. The mobile communications device to which the data is to be transmitted is identified using an identifier called Radio Network Temporary Identifier (RNTI). There are various types of RNTI allocated to mobile communications devices in accordance with a relative phase of a communication session in which data is communicated to or from the mobile communications device. Thus the eNode B transmits a message in the physical down-link control channel providing the RNTI of the mobile communications device (or devices) which is to receive data on the down-link and an indication of the down-link communications resources that have been allocated on the down-link shared channel to the mobile communications device(s). In LTE, RNTIs either uniquely identify a mobile communications device within a cell, like a C-RNTI which is used for example to send downlink data to one specific mobile communications device only, or they identify all the mobile communications devices in the cell. For example, a SI-RNTI is used to send downlink data to all the mobile communications devices in the cell.

Figure 2:
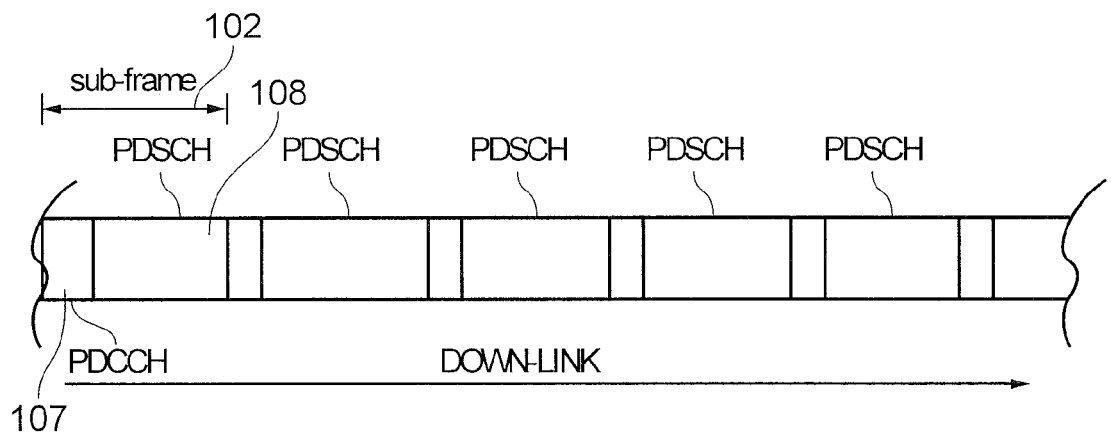
FIG. 2 is a schematic representation of a down-link frequency carrier comprising sub-frames.
Figure 3:
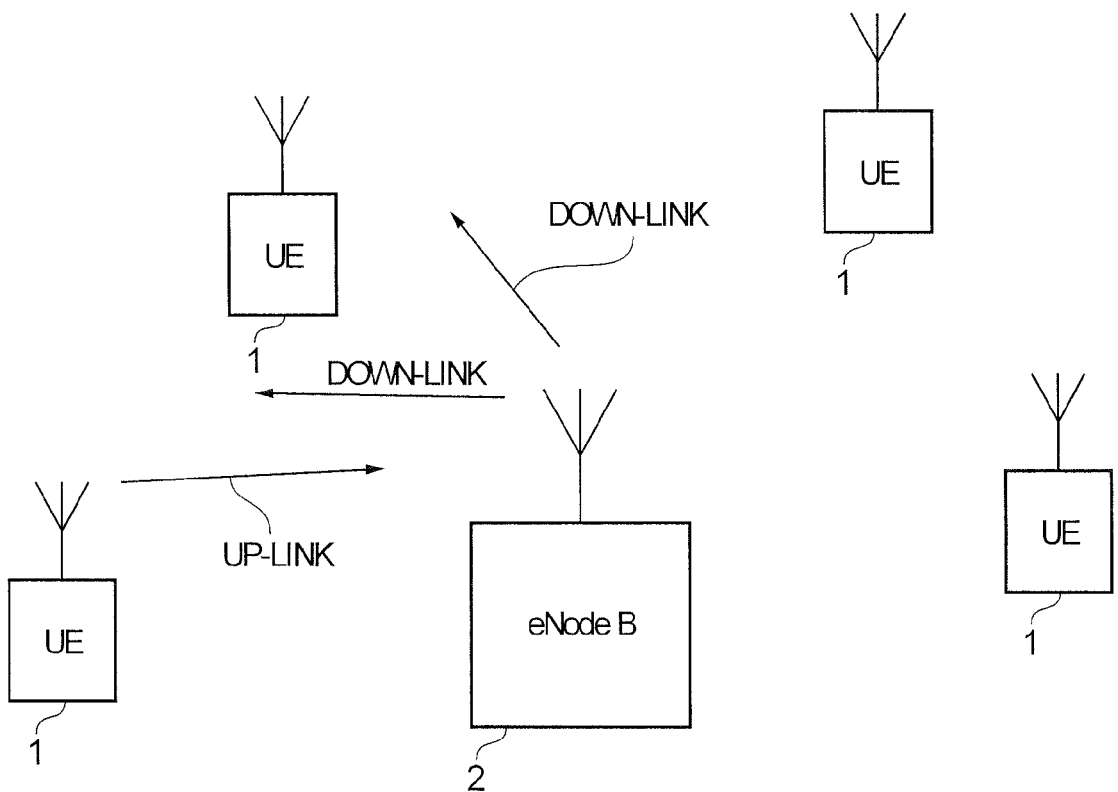
FIG. 3 is a schematic representation of a mobile network with up-link and down-link communications.

An example of a down-link arrangement of the physical down-link shared channels and the physical down-link control channel is shown in FIG. 2. In the PDCCH region 107 of the sub-frame 102, zero one or more PDCCHs are transmitted to zero, one or more terminals. In the PDSCH region 108, zero one or more PDSCH are transmitted to zero, one or more terminals based on resource allocation messages transmitted on PDCCHs in the PDCCH region 107. As explained above mobile communications devices are arranged to communicate via a base station or e-NodeB 2, using up-link and down-link shared communications resources. Thus, as shown in FIG. 3, a plurality of mobile communications devices 1 communicate via an e-NodeB 2. Thus FIG. 3 provides a simplified representation of a group of mobile communications devices which are operating within a cell served by the e-NodeB 2. As will be appreciated therefore the mobile communications devices must be allocated resources on the down-link shared channels in order to receive data from the base station.

Figure 4:
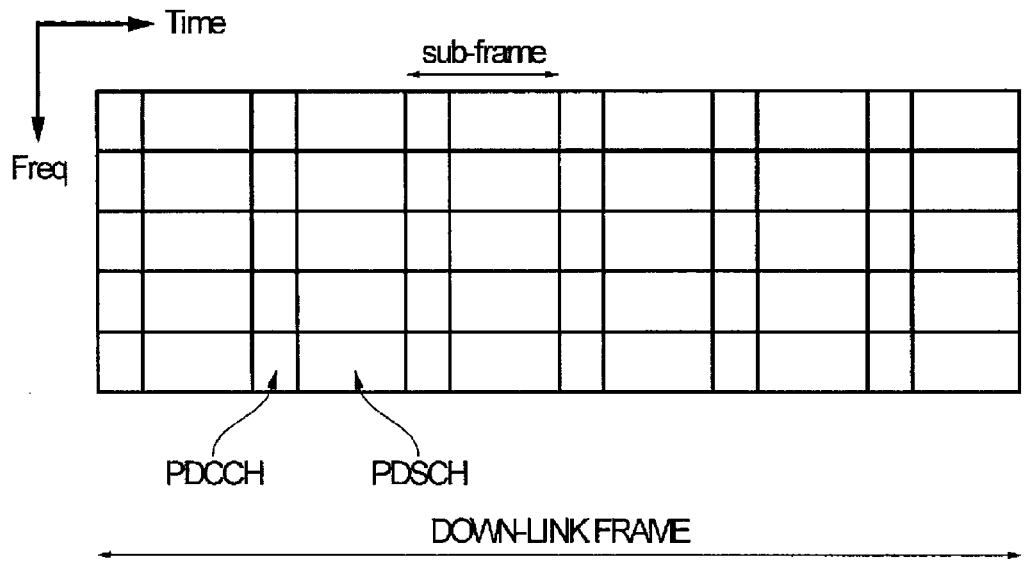
FIG. 4 is a schematic representation of a downlink frame comprising 6 sub-frames.

As will be appreciated the down-link channel illustration provided by FIG. 2 is in a somewhat simplified form. According to the LTE standard, a physical down-link frame is illustrated in FIG. 4. Likewise, FIG. 4 is a somewhat simplified form, for example a LTE frame usually includes 10 sub-frames but only 6 sub-frames have been represented for the downlink frame of FIG. 4. In FIG. 4 the PDCCH is shown which occupies some time and frequency resources within a resource zone that stretches across the entire frequency band and across 1 to 4 symbols, where the time and frequency resources are usually distributed within that zone based on a pre-determined algorithm. For 1.4 MHz LTE systems, the PDCCH region is between 2 and 4 symbols wide. For higher LTE bandwidths, the PDCCH region is between 1 and 3 symbols wide, hence "across 1 to 4 symbols" reflects in one example different implementations of LTE system bandwidths.

In contrast the Physical Down-link Shared CHannel (PDSCH) is comprised of a plurality of time and frequency resources which are allocated via the PDCCH. In effect, the PDCCH provides the mobile communications devices with the resource allocations where each mobile communications device is addressed by its RNTI. A mobile communications device can therefore, based on the RNTI, know which resource allocations it should decode to receive its data. The data may be either data for this mobile communications device only or for all mobile communications devices in the cell.

Figure 5:
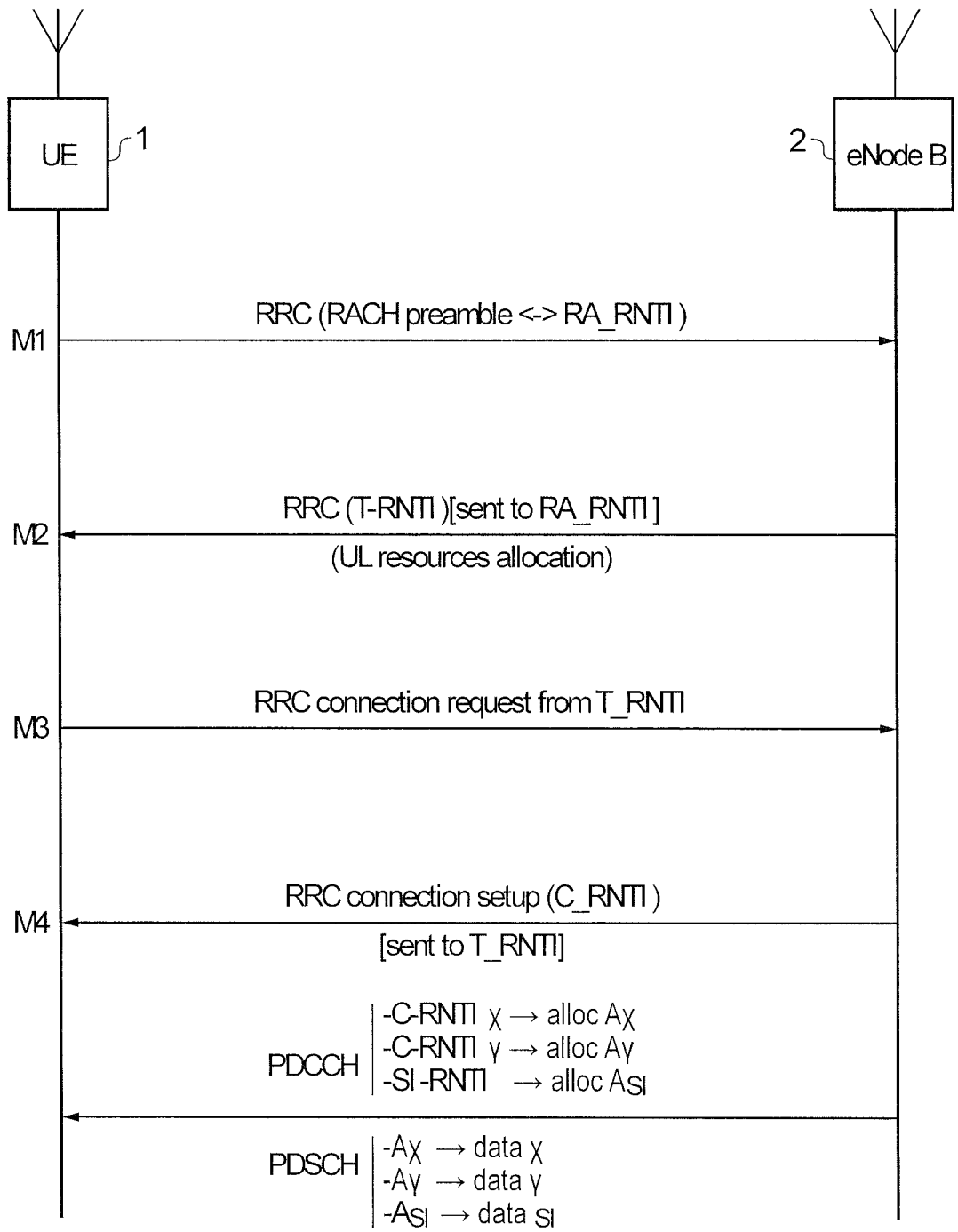
FIG. 5 is a simplified call-flow showing the RNTI allocation during an RRC connection setup.

A message sequence flow showing an exchange of messages which are required in order to allocate resources on the down-link as well as the up-link is shown in FIG. 5. In FIG. 5 a terminal 1 is shown communicating messages to and receiving messages from an e-NodeB 2 when setting up a connection with the e-NodeB 2. The first message M1 is a message from the terminal 1 to the e-NodeB 2 which comprises a RACH message including a RACH preamble. From the RACH preamble, a RA-RNTI ("Random Access RNTI") can be identified. The e-NodeB 2 then responds to the terminal 1 with message M2, sent to the RA-RNTI identified from the RACH preamble and comprising in particular a T-RNTI ("Temporary RNTI") and an uplink resource allocation.

The terminal 1 sends message M3 using the uplink resource allocation indicated in message M2, where the message is a RRC connection request sent as coming from the terminal with the T-RNTI indicated in message M2. The e-NodeB 2 responds to message M3 with a RRC connection setup message M4. M4 is sent to the T-RNTI of messages M2 and M3 and comprise the C-RNTI that the terminal 1 will use for the duration of the RRC connection. In effect, the C-RNTI is usually the same as the T-RNTI. In other words, once the RRC connection setup is successfully completed, the T-RNTI becomes the C-RNTI.

The usual way for a terminal 1 to receive data once the RRC connection has been successfully established is shown in FIG. 5. The terminal 1 will receive downlink data on a downlink shared channel of the type shown in FIG. 4, i.e. by receiving a PDCCH and a PDSCH. The PDCCH will indicate in particular the resource allocation in the PDSCH and the RNTI will indicate the terminal that the allocation is addressed to. For example the terminal with C-RNTI x is given the resource allocation $A_x$, the terminal with C-RNTI y is given the resource allocation $A_y$ and the system information, identified with the SI-RNTI, is given the resource allocation $A_{SI}$. Then, based on the RNTIs in the PDCCHs, the terminal 1 knows which resource elements to decode in the PDSCH. If for example the terminal 1 has the C-RNTI x, terminal 1 then decodes the data that has been allocated $A_x$ (which is transmitted for this terminal only) and the data that has been allocated $A_{SI}$ (which is transmitted for all terminals in the cell). Terminal 1 will for example not decode the data that has been allocated $A_y$ because the C-RNTI y does not indicate that the data is for terminal 1. As can be seen in this example, the terminal 1 may decode data for several RNTIs, in this case C-RNTI x and SI-RNTI. In another example, the terminal 1 may have more than one C-RNTI identifying it. For example, the data in allocation $A_x$ and $A_y$ may be for the same terminal 1 if terminal 1 can be identified as C-RNTI x and C-RNTI y. For information, various examples of RNTI types are provided in a table in the appended Annex.

Using this RNTI identification system, a downlink carrier can easily be shared amongst several terminals where each terminal knows where to find its data based on allocations in the PDCCH and the RNTI transmitted in the PDCCH.

As will be appreciated from the above explanation in order to receive an allocation of resource then a mobile communications device must be explicitly identified using one of its RNTIs. In an MTC or dedicated messaging network, terminals which are operating as MTC type devices may be required to communicate a plurality of signalling messages in order to transmit a data message. In one example, in order to transmit for example a meter reading, a terminal will be required to exchange a series of messages via and/or to the base station which may include:
  RRC connection
  Authentication via a remote authentication server
  Session start with meter reading server
  Meter reading data transfer which may also include an exchange of messages associated with the data transmission
  Session with meter reading server tear down
  RRC connection tear down.

In an LTE Network these messages are scheduled on shared channels using the PDCCH which communicates allocation messages to the terminals. The LTE standard defines that the PDCCH is to be sent in the control region at the beginning of each sub-frame, where the control portion is between 1 and 4 symbols long. The size of the control region is limited, thereby limiting the resources that can be allocated to PDCCH messages. Thus, when there are many small messages to be transmitted such as for example, short signalling messages, system capacity may be limited by the amount of available signalling resource which would be the number of PDCCHs available for an LTE network. Therefore the amount of data that can be transmitted to terminals is not in that case limited by the actual down-link capacity (e.g. the number of PDSCH), but by the capacity to signal those PDSCHs using PDCCHs.

According to the present technique an arrangement is provided for reducing the size of the allocation message to mobile communications devices for communicating data. As a result, the number of allocation messages which can be communicated via for example a PDCCH can be increased which, in turn, increases the resources allocated for transmitting data to terminals. In other words the number of PDCCHs per sub-frame can thereby be increased.

Super-Frame Format

According to the present technique there is provided a super-frame structure, the super-frame comprising a plurality of down-link sub-frames, where some terminals are provided with a short identifier which can be used within the super-frame, for example for allocating communications resources on a downlink shared channel.

Figure 6:
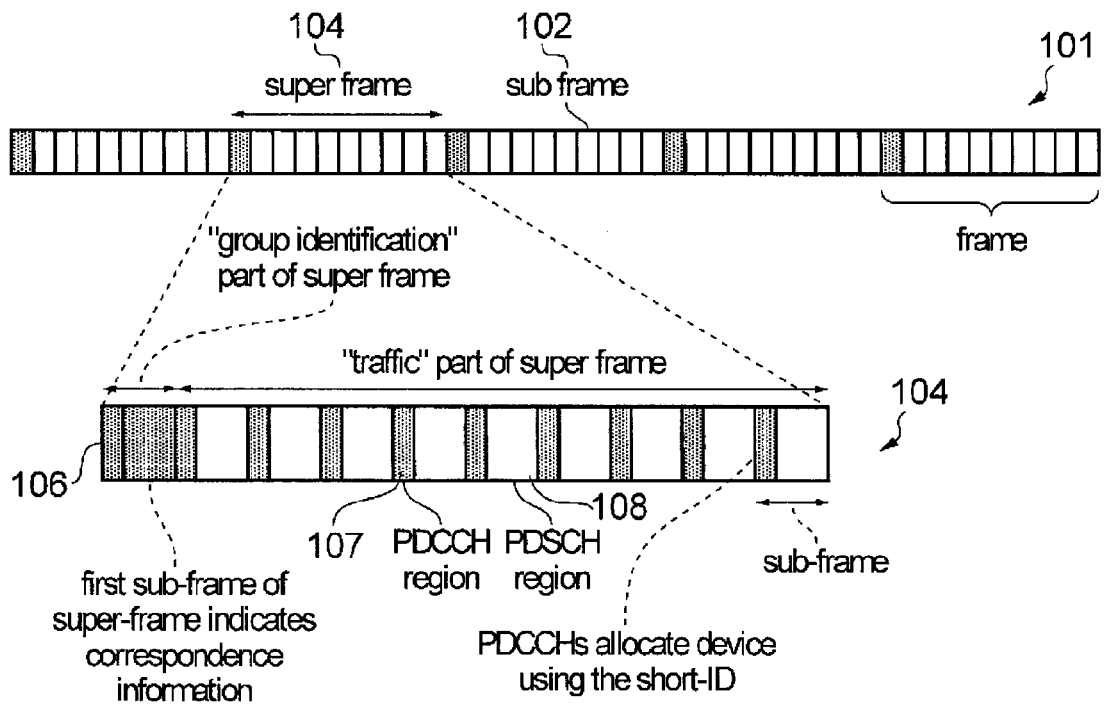
FIG. 6 is a schematic representation of a super-frame according to an embodiment of the invention.

In one example, the super-frame could be the duration of an LTE frame which is ten sub-frames or ten milliseconds or, in another example, it might be a multiple of the LTE frame duration. FIG. 6 provides an example arrangement of a down-link frame structure illustrating a super-frame, where the super-frame is 10 sub-frames long. In FIG. 6, a first frame structure 101 is shown to be comprised of a plurality of sub-frames 102. In an expanded form of a super-frame 104, it can be seen that the super-frame is comprised of a number of sub-frames. Each sub-frame includes PDCCHs as well as PDSCHs where the PDCCHs can be found in the PDCCH region 107 and the PDSCHs in the PDSCH region 108.

In accordance with the present technique, a mapping of RNTI and short-identifiers (or "short-IDs") is provided to the terminals in a sub-frame of the super-frame. In the example of FIG. 6, the super-frame 104 consists of one frame in a time-dimension, and the correlation or correspondence 106 between a set of RNTIs and a set of short-IDs is communicated in the first sub-frame of the super-frame. Examples of such correspondence are given in FIGS. 8*a* to 8*c*, which are further discussed below. In this and the next sub-frames of the super-frame, the terminals can identify their down-link resource allocation using their short-ID. The terminals can also still use the longer RNTI, but it is advantageous to use the short-IDs, if possible, because it reduces the amount of resources to be used for allocation messages, e.g. PDCCHs, as explained below.

In LTE, the RNTI is conventionally used to mask a cyclic redundancy check code (CRC) of the PDCCH transmission, where the RNTI and the PDCCH CRC are both 16 bits long. This is done by scrambling the PDCCH CRC with the RNTI. In accordance, if a PDCCH-like allocation message is to be sent, the short-ID which may for example be 8 bits could be used to mask a shorter CRC for example which may also be 8 bits or the short IDs of a plurality of terminals may be jointly coded within a PDCCH which allocates resources to a plurality of terminals where the 16 bit CRC is used for the PDCCH with a conventional format. Therefore, shorter allocation messages may be used and, because the number of short-IDs to be used is lower than the number of possible RNTIs as provided by the LTE standard ($2^{16}$ possible RNTIs), the short-ID can be chosen to be much shorter than the RNTI, for example 4 bits. In this example situation, the allocation message can be reduced by 12 bits, thereby providing a reduction in size of between 25% and 34%, depending on the format applied to the PDCCH. In general, allocation messages are not of a fixed size and to ensure that a reduction in identifier size from 16 to 4 reduces the message size then other changes may also be made.

Figure 10:
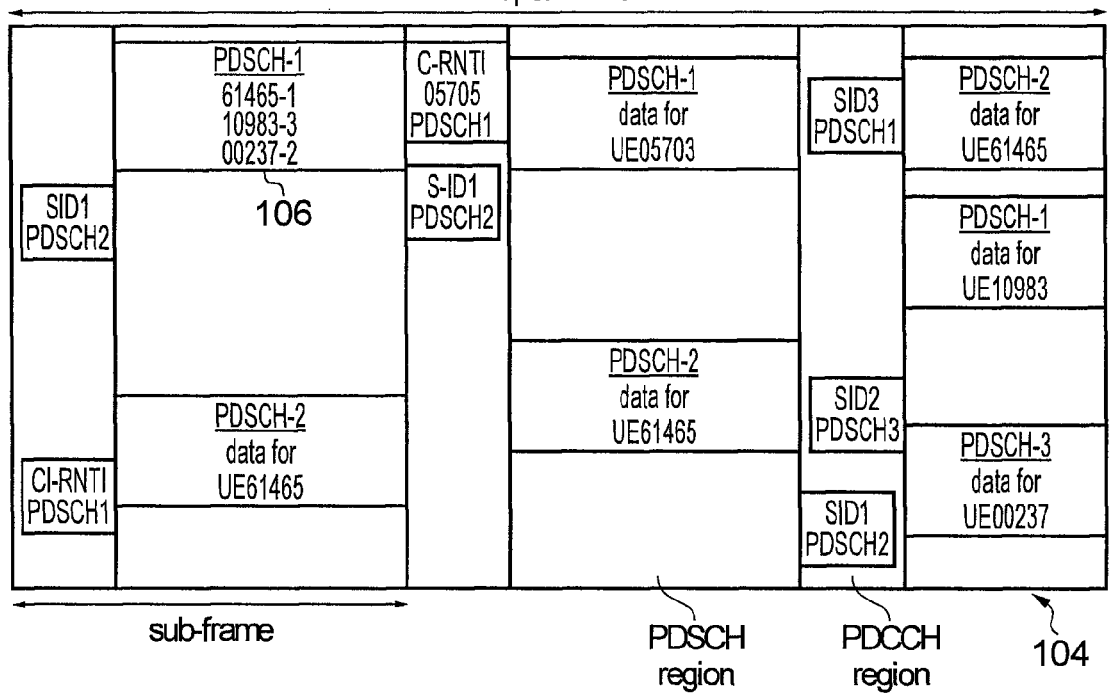
FIG. 10 is an example of a super-frame comprising 3 sub-frames according to a further embodiment of the invention.

A further example is illustrated in FIG. 10 with a three sub-frame super-frame 104. The first sub-frame includes a table of correspondence 106 between three C-RNTI corresponding to three different terminals and short-IDs. In this example, this message is sent like any other downlink data, that is, in a Physical Down-link Shared Channel (PDSCH-1) to which a PDCCH points. In another example, the correspondence information may be communicated in a different manner, for example within the PBCH. In FIG. 10, the PDCCH allocating PDSCH-1 contains a CI-RNTI (correspondence information RNTI) such that all terminals within the cell decode the correspondence information 106. The correspondence information RNTI is an RNTI that is shared or common to a plurality of UEs and indicates that correspondence information is transmitted in the PDSCH in the sub-frame. The same sub-frame also includes PDSCH-2 with data for the terminal with the C-RNTI "61465" (UE61465), where PDSCH-2 is allocated with a PDCCH or PDCCH-like message using the short ID "1", according to the information 106. In use, UE61465 would receive the first sub-frame; decode PDSCH-1 (like all terminals within the cell) such that it knows that short-ID "1" refers to its own C-RNTI; identify that PDSCH-2 is for UE61465 as well with the PDCCH for short-ID 1; and decode PDSCH-2. As is now apparent, the allocation messages, for example PDCCH and PDCCH-like messages, can be substantially reduced in size by using short-IDs within a super-frame. Therefore, more allocation messages can be included within the PDCCH region and more PDSCH can therefore be allocated, if necessary.

According to the present technique, a CI-RNTI is provided because typically the SI is only typically read on a periodic basis. Hence a form of shared or common RNTI is used instead of the SI-RNTI, which is referred to as a "CI-RNTI".

As shown in FIG. 10, in the next and second sub-frame, both newly-introduced short-IDs and legacy RNTIs may be used in the same sub-frame. In this example UE05705 identifies that PDSCH-1 has to be decoded based on its C-RNTI "05705", and UE61465 identifies that PDSCH-2 has to be decoded based on its short-ID "1". Therefore, backward compatibility with traditional LTE is ensured, while shorter allocation messages using short-IDs may be used.

The last sub-frame of the super-frame in FIG. 10 shows an example where only short-IDs are used within a sub-frame. The super-frame could also be arranged to only include allocations based on short-IDs in every of its sub-frames.

Figures 7, 8A, 8B, 8C:
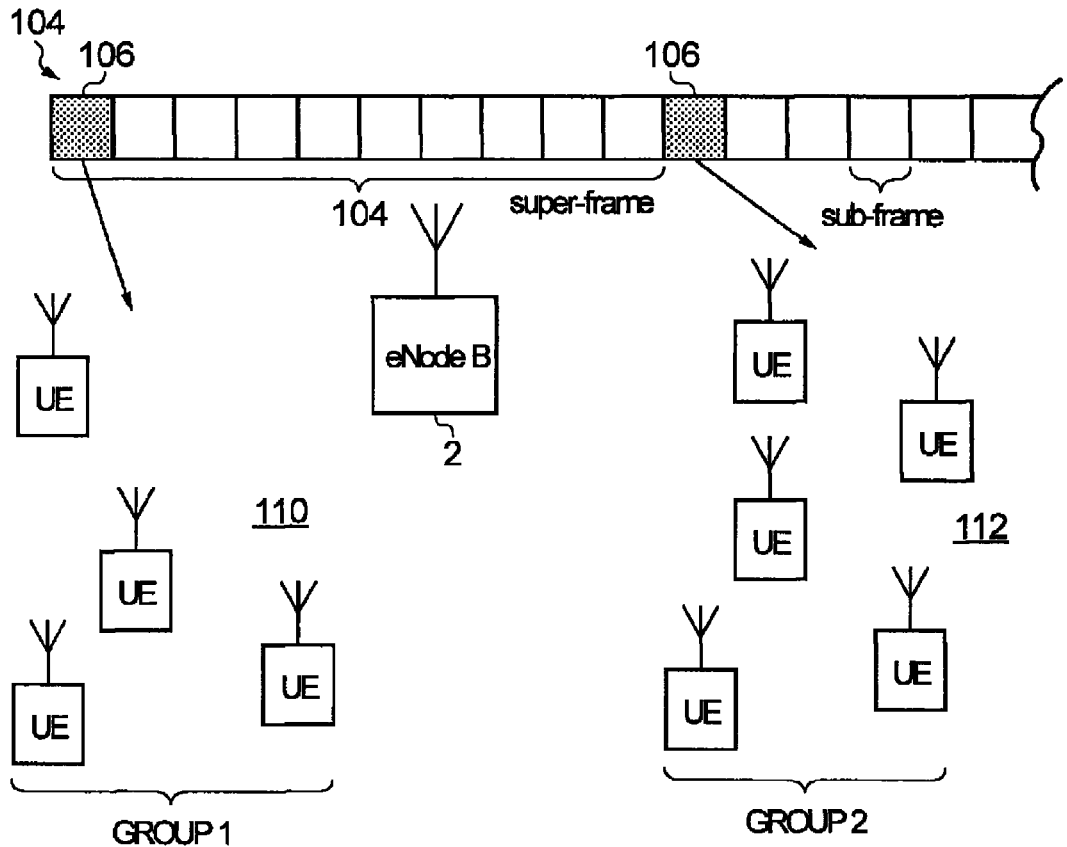
FIG. 7 is a schematic representation of two super-frames according to another embodiment of the invention.
FIGS. 8a to 8c are examples of mapping or correspondence between RNTIs and short-IDs.

For example and as shown schematically in FIG. 7, the e-NodeB 2 is transmitting down-link data in two super-frames each of which includes correspondence information 106 transmitted in the example on the first sub-frame of each super-frame, where the data in each of the super-frames is only for terminals listed in the correspondence information 106. The correspondence information 106 may provide an explicit mapping between RNTIs and short-IDs for one or more super-frames or it may indicate a group of terminals that have previously been assigned a semi-permanent mapping between RNTI and short-ID. This is because correspondence information may simply indicate that group "A" or group B are being allocated in the next super-frame. Group A would have been defined some time before the current super-frame and each terminal in group A would know both its full RNTI and its short-ID. The groups may be determined in accordance with a type of the terminal, for example, group B could correspond to a particular type of terminals such as "smart meters". As shown in FIG. 7 a first group 110 is comprised of four communications devices and receives data in the first super-frame. Group 110 may have been assigned a semi-permanent mapping between RNTI and short-ID one or more super-frames previously, for example terminals within group 110 may have been assigned an RNTI to short-ID mapping at RRC connection setup. A second group 112 is comprised of five terminals and receives data in the second super-frame. Terminals in group 112 may similarly have been assigned an RNTI to short-ID mapping one or more super-frames previously. For ease of representation, the two groups have been represented as two completely distinct groups even though some terminals may be in both groups. The correspondence information 106 may thus consist of a group identity (possibly in addition to other parameters) and the short-IDs that are transmitted in that super-frame relate to the group signalled in the correspondence information. In one example, the correspondence information may just contain a group identity, and may include "other parameters".

When and if forming groups, there are various ways of assigning terminals to groups which include:
By a type of device, for example smart meters are divided into a separate group whereas vending machines may be divided into a different group.
By RNTI, for example the most significant "N" bits of the RNTI could define the group identity while the "16-n" least significant bits define the identity of terminals within the group.
By an explicit assignment to a group, for example at call setup the base station could assign terminals to a particular group. This assignment could be fairly disparate, for example there could be a mix of RNTI's and device types within the group.
By a pre-determined Group ID, for example provided within the terminal's profile in the HLR/HSS.
By an expected amount and/or type of traffic from the terminal.

Generally, similar criteria may be used to decide which RNTI should be given a short ID within the correspondence information 106. Also, as the correspondence information matches a RNTI with a short-ID. For example, one terminal may have two C-RNTIs but it may be decided that only one RNTI will be given a short-ID, if for example it is considered to be the only relevant RNTI to be given a short-ID. In another example, it may be decided that if one terminal-specific RNTI is given a short-ID, then all other terminal-specific RNTI identifying the same terminal are also given a short-ID, which can be the same as or different to the first short-ID it has been given.

Also any suitable combination of RNTIs and short-ID may be provided, a few of which are illustrated in particular in FIG. 8*c*. In this example, UE61465 and UE00237 have been given the same short-ID "1" such that any data transmitted to the short-ID "1" will be decoded by both terminals. This can be useful if for example a new price list is to be sent to several vending machines. The vending machines in the same cell can be given the same short-ID such that they will all receive the new price list with one message sent to this short-ID. Using the table of FIG. 8*c* may not only help increase the number of PDCCH or PDCCH-like messages that can be sent in a sub-frames, it also increases the resources available for PDSCH data, as the same data may be sent to a n terminals with only one PDSCH, rather than sending n PDSCH (and n corresponding long or short PDCCH).

Any RNTI may be assigned a short-ID and thus, particular RNTIs may also be assigned a short-ID. For example, in FIG. 8*c*, RNTI 65535 has been given a short-ID, where this particular RNTI value corresponds in LTE to the SI-RNTI. If for example it is anticipated that the e-NodeB will be required to send several system information messages to all terminals in the cell in the next sub-frames, it can then be advantageous to have a short-ID corresponding to the SI-RNTI in order to reduce the size of allocation messages for system information messages which are expected to be sent in the next sub-frames.

FIGS. 8*a* and 8*b* also show that the allocation may be an explicit allocation (FIG. 8*a*) or an implicit allocation (FIG. 8*b*) using for example the position of a RNTI in a list to infer the corresponding short-ID. Such an implicit allocation may for example help to reduce the size of the correspondence information 106 by simply sending the list of RNTIs that have been given a short-ID.

Figure 9:
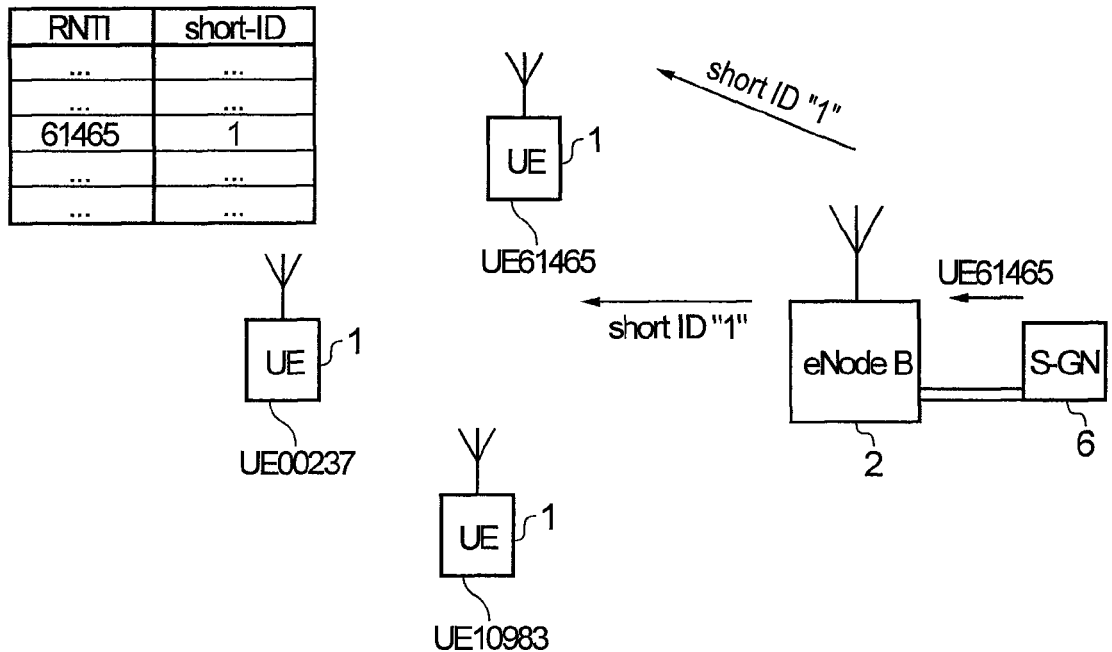
FIG. 9 is a schematic representation of a downlink message translation process from RNTI to Short-ID.

FIG. 9 provides an illustrative representation of the operation of the terminals and the mobile radio network which implements communication using the super-frame structure and the short ID's explained above. In FIG. 9 three terminals UE61465, UE10983 and UE00237 are shown to be communicating with an e-NodeB 2. Also shown is a serving gateway 6. The e-NodeB 2 receives from the serving gateway 6 a message to be communicated to the terminal UE61465. If a super-frame is being provided on the down-link, or if it has been decided to provide one, the e-NodeB translates the RNTI 61465 into the short-ID "1" and inserts a PDCCH using the short-ID within a downlink sub-frame of the super-frame, rather than insert a full-size PDCCH with the full-size C-RNTI.

The length of a super-frame may vary on super-frame by super-frame basis. For example a first super-frame may be 10 sub-frames long whilst the next one is 8 sub-frames long. Also the short-ID are intended to be allocated for the duration of a super-frame when a super-frame is of fixed duration. Even though the super-frame is initially intended to be used for short periods of time, possibly on a regular basis, the super-frame may also be provided for an undetermined length, on the assumption that the super-frame will be provided until it is not needed anymore. In such a case, the correspondence information may be updated one or more times whilst the super-frame is provided. Such updates provides flexibility to ensure the short-IDs utilization can be adjusted to better correspond to the current use of the down-link and the terminals can then maintain the correspondence between RNTIs and short-IDs up-to-date when receiving the updates.

The correspondence information 106 transmitted in the super-frame may not be received by one or more terminals, as a result for example of errors occurring during transmission via the radio communications channel. The eNode B 2 may try to ascertain whether the correspondence information 106 has been received by a terminal 1, for example by operation of an algorithm determining whether one or more PDCCHs transmitted to that terminal using a short-ID are acknowledged by that terminal. If the algorithm indicates that the terminal has not received the correspondence information, the eNode B may either re-transmit the correspondence information or may schedule that terminal using its full RNTI for the remaining duration of the super-frame.

When the length of the super-frame is of an un-determined duration, when the super-frame eventually terminates, the eNode B may require an acknowledgement from terminals that are indicated within the correspondence information signalled within the super-frame. These acknowledgements may resolve ambiguity between short-IDs that are re-used in proximate super-frames. Alternatively, the set of short-IDs used in one super-frame may be disjoint to the set of short-IDs used in a subsequent frame; this allows terminals to receive plural super-frame end-indications, thus reducing ambiguity.

In some embodiments, the super-frame timing and duration may align with the paging cycle or DRX cycle of one or more terminals or groups of terminals.

Further example implementations of the present technique are defined in the following numbered clauses:

1. An infrastructure equipment of a mobile communications system for communicating data to and/or from mobile terminals, the infrastructure equipment comprising a transmitter and a receiver which are arranged in operation to provide a wireless access interface for communicating the data to and/or from the mobile terminals, and a scheduler for allocating communications resources of the wireless access interface to the mobile terminals for communicating the data, wherein the wireless access interface provides a down-link frequency channel for communicating data to the mobile terminals, the down-link frequency channel being divided in time into different units of communications resource which are allocated by the scheduler of the infrastructure equipment to the mobile terminals, and a shared control channel for communicating resource allocation messages to the mobile terminals, each resource allocation message including an identification number allocated to one of the mobile terminals for indicating an allocation of one of the units of communications resource of the wireless access interface, and each of a plurality of the mobile terminals is divided into a plurality of different groups, and the infrastructure equipment is adapted to form super-frames comprising a plurality of the units of communications resource of the down-link channel, to transmit in a first of the super-frames control information providing for each of the plurality of mobile terminals in a first of the groups of devices a short identification number in association with the identification number allocated to the mobile terminal by the infrastructure equipment for use in allocating the units of communications resource to the mobile terminal for the first super-frame, and to transmit in a second of the super-frames control information providing for each of the plurality of mobile terminals in a second of the groups of terminals a short identification number in association with the identification number allocated to the mobile terminal by the infrastructure equipment for use in allocating the units of communications resource to the mobile terminal for the second super-frame, and to adapt each of the resource allocation messages to include a plurality of the short identification numbers when allocating the units of communications resources to a plurality of the mobile terminals in the first or the second super-frames.

2. An infrastructure equipment according to clause 1, wherein one of the short identification numbers in the first super-frame is allocated to identify a different mobile terminal from the second group of devices in the second frame.

3. An infrastructure equipment according to clause 1 or 2, wherein the control information comprises an indication of the units comprised in the super-frame.

4. An infrastructure equipment according to clause 3, wherein the indication provides a number of subsequent units in the super-frame and indicates the first unit of the super-frame.

5. An infrastructure equipment according to clause 2, wherein the indication comprises a list of units comprised in the super-frame.

6. An infrastructure equipment according to clause 1, wherein the infrastructure equipment is operable to transmit a resource allocation message to one of the mobile terminals of the second group which is not a member of the first of the groups of mobile terminals in the first super frame, the resource allocation message including the identification number of the mobile terminal.

7. An infrastructure equipment according to any preceding clause, the mobile communications system is arrange to select the identification numbers based on at least a profile of the one or more terminals corresponding to the identifier.

8. An infrastructure equipment according to clause 7, wherein the selecting the identification numbers includes selecting the identification numbers for the mobile terminals based on at least an expected traffic amount and/or type from the one or more terminals corresponding to the identifier.

9. An infrastructure equipment according to any preceding clause, wherein the identification number is a Radio Network Temporary Identifier.

10. A method of operating an infrastructure equipment in a mobile communications network for communicating data to and/or from mobile terminals, the method comprising providing a wireless access interface from the infrastructure equipment for communicating the data to and/or from the mobile terminals, and allocating communications resources of the wireless access interface to the mobile terminals for communicating the data, wherein the providing the wireless access interface includes providing a down-link frequency channel for communicating data to the mobile terminals, the down-link frequency channel being divided in time into different units of communications resource which are allocated by the infrastructure equipment to the mobile terminals, and providing a shared control channel for communicating resource allocation messages to the mobile terminals, each resource allocation message including an identification number allocated to one of the mobile terminals for indicating an allocation of one of the units of communications resource of the wireless access interface, and the allocating the communications resources of the wireless access interface to the mobile terminals includes dividing each of a plurality of the mobile terminals into a plurality of different groups, forming a super-frame comprising a plurality of the units of communications resource of the down-link channel, transmitting in a first of the super-frames control information providing for each of the plurality of mobile terminals in a first of the groups of devices a short identification number in association with the identification number allocated to the mobile terminal by the infrastructure equipment for use in allocating the units of communications resource to the mobile terminal for the first super-frame, and transmitting in a second of the super-frames control information providing for each of the plurality of mobile terminals in a second of the groups of terminals a short identification number in association with the identification number allocated to the mobile terminal by the infrastructure equipment for use in allocating the units of communications resource to the mobile terminal for the second super-frame, and adapting each of the resource allocation messages to include a plurality of the short identification numbers when allocating the units of communications resources to a plurality of the mobile terminals in the first or the second super-frames.

Various further aspects and features of the present invention are defined in the appended claims. Various modifications may be made to the embodiments described above without departing from the scope of the present invention. For example, embodiment of the present invention finds application with other types of mobile communications networks providing downlink communications and is not limited to LTE or 3GPP networks.

Annex

| Identifier | Name | To | usage |
| --- | --- | --- | --- |
| P-RNTI | Paging RNTI | All UEs in the cell | If a PDCCH (allocation message) with this RNTI is received, then all UEs read some PDSCH resource that has been allocated by the PDCCH. That PDSCH resource will then contain paging messages. |
| SI-RNTI | System Information RNTI | All UEs in the cell | If a PDCCH (allocation message) with this RNTI is received, then all UEs read some PDSCH resource that has been allocated by the PDCCH. That PDSCH resource will then contain system information for the cell. |
| RA-RNTI | Random access RNTI | One specific UE | When a UE performs a RACH, it chooses a time-frequency resource (quasi-randomly) to use for the RACH. The time-frequency resource is mapped on a one-to-one basis with a RA-RNTI. The RA-RNTI is used to respond to the RACH. |
| C-RNTI | Cell RNTI | One specific UE | Used to schedule UEs with PDSCH resource during normal operation. The PDCCH that allocates a UE has its CRC bits scrambled with the C-RNTI. The C-RNTI is inherited from the T-RNTI. The C-RNTI is re-allocated during the handover procedure. |
| Temporary-RNTI | T-RNTI | One specific UE | Allocated during the random access response. The UE uses this T-RNTI until the contention resolution process is complete. Once contention resolution is complete, the T-RNTI becomes the C-RNTI. |
| SPS-RNTI | Semi-persistent scheduling RNTI | One specific UE | |
| TPC-PUSCH-RNTI | Transport power control of PUSCH RNTI | One specific UE | |
| TPC-PUCCH-RNTI | Transmit power control for PUCCH RNTI | One specific UE | |

The invention claimed is:

1. A mobile terminal for use in a mobile communications network, the mobile terminal comprising:
a transmitter and a receiver which are configured to transmit and to receive data via a wireless access interface for communicating the data to and/or from a base station of the mobile communications network, the wireless access interface providing
a shared communications channel for communicating the data to or from the mobile communications network, the shared channel being divided in time into units of communications resource which are allocated by a scheduler of the base station to the mobile terminal, and
a shared control channel for receiving a resource allocation message from the base station, wherein
the mobile terminal is configured
to receive control information providing the mobile terminal with a short identification number in association with an identification number allocated to the mobile terminal by the mobile communications network, the short identification number being allocated to the mobile terminal by the mobile communications network for one super-frame which comprises a plurality of the units of communications resource of the shared channel, the short identification number being allocated to the mobile terminal as one member of a group of mobile terminals, and
to receive the resource allocation message which includes the short identification number to identify the mobile terminal and to allocate units of the communications resource to the mobile terminal in the one super-frame, wherein
the control information provides correspondences between a set of identification numbers allocated to a plurality of mobile terminals including the identification number allocated to the mobile terminal and a set of short identification numbers allocated to the a plurality of mobile terminals including the short identification number allocated to the mobile terminal and is updated on a per super-frame basis.

2. The mobile terminal as claimed in claim 1, wherein the resource allocation message is received by the mobile terminal from the mobile communications network providing an allocation of the units of the communications resource on the shared channel, and the resource allocations messages are configured to include the short identification number in place of an identification number of the mobile terminal.

3. The mobile terminal as claimed in claim 2, wherein the control information provides the mobile terminal with the short identification number in association with the identification number allocated to the mobile terminal by the mobile communications network for use in allocating the units of communications resource to the mobile terminal, the control information provided to the mobile terminal as a member of a first group, the control information providing to each of a plurality of mobile terminals in the first group an allocation of the short identification numbers for use in a first super-frame, the control information providing to each of a plurality of mobile terminals in a second of group the short identification number in association with the identification number allocated to the mobile terminal by the mobile communications network for use in allocating the units of communications resource to the mobile terminals of the second group for a second super-frame.

4. The mobile terminal as claimed in claim 3, wherein the short identification number allocated to the mobile terminal for the first super-frame is allocated to identify a different mobile terminal from the second group of devices in the second super-frame.

5. The mobile terminal as claimed in claim 1, wherein the control information includes an indication of the units of communications resources comprised in the super-frame.

6. The mobile terminal as claimed in claim 5, wherein the indication provides a number of units of communications resource which are comprised in the super-frame and indicates a first of the units of one of the super-frames.

7. The mobile terminal as claimed in claim 1, wherein the mobile communications network is configured to select the identification number based on at least a profile of the mobile terminal.

8. The mobile terminal as claimed in claim 1, wherein the identification number is selected based on at least an expected traffic amount and/or type from the mobile terminal.

9. The mobile terminal as claimed in claim 1, wherein a timing of the super-frame and duration of the super-frame aligns with a paging cycle or discontinuous reception cycle of the mobile terminal.

10. The mobile terminal as claimed in claim 1, wherein the identification number is a Radio Network Temporary Identifier.

11. A method of communicating using a mobile terminal, the mobile terminal including: a transmitter and a receiver which are configured to transmit and to receive data via a wireless access interface for communicating the data to and/or from a base station of a mobile communications network, the wireless access interface providing a shared channel for communicating data to or from the mobile communications network, the shared channel being divided in time into units of communications resource which are allocated by a scheduler of the base station to the mobile terminal, and a shared control channel for receiving a resource allocation message from the base station, the method comprising:
receiving control information providing the mobile terminal with a short identification number in association with an identification number allocated to the mobile terminal by the mobile communications network, the short identification number being allocated to the mobile terminal by the mobile communications network for one super-frame which comprises a plurality of the units of communications resource of the shared channel, the short identification number being allocated to the mobile terminal as one member of a group of mobile terminals; and
receiving the resource allocation message which includes the short identification number to identify the mobile terminal and to allocate units of the communications resource to the mobile terminal in the one super-frame, wherein
the control information provides correspondences between a set of identification numbers allocated to a plurality of mobile terminals including the identification number allocated to the mobile terminal and a set of short identification numbers allocated to the plurality of mobile terminals including the short identification number allocated to the mobile terminal and is updated on a per super-frame basis.

12. The method as claimed in claim 11, wherein the receiving the resource allocation message includes receiving the resource allocation message by the mobile terminal from the mobile communications network providing an allocation of the units of the communications resource on the shared channel, the resource allocation message including the short identification number in place of an identification number of the mobile terminal.

13. The method as claimed in claim 12, wherein the control information provides the mobile terminal with a short identification number in association with the identification number allocated to the mobile terminal by the mobile communications network for use in allocating the units of communications resource to the mobile terminal, the control information provided to the mobile terminal as a member of a first group, the control information providing to each of a plurality of mobile terminals in the first group an allocation of the short identification numbers for use in a first super-frame, the control information providing to each of a plurality of mobile terminals in a second of group a short identification number in association with the identification number allocated to the mobile terminal by the mobile communications network for use in allocating the units of communications resource to the mobile terminals of the second group for a second super-frame.

14. The method as claimed in claim 13, wherein the short identification number allocated to the mobile terminal for the first super-frame is allocated to identify a different mobile terminal from the second group of devices in the second super-frame.

15. The method as claimed in claim 11, wherein the control information includes an indication of the units of communications resources comprised in the super-frame.

16. The method as claimed in claim 15, wherein the indication provides a number of units of communications resource which are comprised in the super-frame and indicates a first of the units of one of the super-frames.

17. The method as claimed in claim 11, wherein the identification number has been selected based on at least a profile of the mobile terminal corresponding to the identifier.

18. The method as claimed in claim 17, wherein the identification number has been selected based on at least an expected traffic amount and/or type from the mobile terminal corresponding to the identifier.

19. The method as claimed in claim 11, wherein a timing of the super-frame and duration of the super-frame aligns with a paging cycle or discontinuous reception cycle of the mobile terminal.

20. The method as claimed in claim 11, wherein the identification number is a Radio Network Temporary Identifier.

21. A mobile terminal comprising:
a communication interface configured to
receive control information providing the mobile terminal with a short identification number in association with an identification number allocated to the mobile terminal by a mobile communications network, the short identification number being allocated to the mobile terminal by the mobile communications network for one super-frame which comprises a plurality of units of communications resource of a shared channel; and
receive a resource allocation message which includes the short identification number to identify the mobile terminal and to allocate units of the communications resource to the mobile terminal in the one super-frame, the short identification number being allocated to the mobile terminal as one member of a group of mobile terminals, wherein
the control information provides correspondences between a set of identification numbers allocated to a plurality of mobile terminals including the identification number allocated to the mobile terminal and a set of short identification numbers allocated to the plurality of mobile terminals including the short identification number allocated to the mobile terminal and is updated on a per super-frame basis.

* * * * *